United States Patent
Ida et al.

(10) Patent No.: US 10,116,836 B2
(45) Date of Patent: Oct. 30, 2018

(54) IMAGE PROCESSING APPARATUS, IMAGE CAPTURING APPARATUS, LENS APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Yoshiaki Ida, Utsunomiya (JP); Shigenobu Sugita, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 15/486,971

(22) Filed: Apr. 13, 2017

(65) Prior Publication Data
US 2017/0302825 A1   Oct. 19, 2017

(30) Foreign Application Priority Data

Apr. 18, 2016   (JP) ................ 2016-082600

(51) Int. Cl.
*H04N 1/60* (2006.01)
*H04N 9/04* (2006.01)
(Continued)

(52) U.S. Cl.
CPC ......... *H04N 1/6027* (2013.01); *G06K 9/4604* (2013.01); *H04N 5/217* (2013.01);
(Continued)

(58) Field of Classification Search
CPC .... H04N 1/6027; H04N 5/217; H04N 5/3572; H04N 9/04; H04N 9/045; H04N 17/002; G06K 9/4604
See application file for complete search history.

(56) References Cited

U.S. PATENT DOCUMENTS 5,796,520 A  *  8/1998  Maruyama ............... G02B 3/04
                                                    359/565
8,395,677 B2      3/2013  Kikuchi et al.
                        (Continued)

FOREIGN PATENT DOCUMENTS

EP    2432227 A1    3/2012
JP    2012044498 A  3/2012
(Continued)

OTHER PUBLICATIONS

European Search Report issued in European Patent Application No. 17166761.1 dated Jul. 27, 2017.

*Primary Examiner* — David F Dunphy
(74) *Attorney, Agent, or Firm* — Rossi, Kimms & McDowell LLP

(57) ABSTRACT

An image processing apparatus (104) includes an acquirer (104b) configured to acquire information related to a lateral chromatic aberration, and a corrector (104c) configured to correct an image to reduce the lateral chromatic aberration based on the information related to the lateral chromatic aberration, the information related to the lateral chromatic aberration includes a first component related to a design value, and a second component related to a manufacturing error, each of the first component and the second component is a rotationally symmetric component.

24 Claims, 4 Drawing Sheets

(51) Int. Cl.
*G06K 9/46* (2006.01)
*H04N 5/217* (2011.01)
*H04N 5/357* (2011.01)
*H04N 17/00* (2006.01)

(52) U.S. Cl.
CPC ............. *H04N 5/3572* (2013.01); *H04N 9/04* (2013.01); *H04N 9/045* (2013.01); *H04N 17/002* (2013.01)

(56) References Cited

U.S. PATENT DOCUMENTS

| | | | |
|---|---|---|---|
| 8,446,477 B2 | 5/2013 | Irisawa et al. | |
| 8,730,357 B2 | 5/2014 | Nishio et al. | |
| 9,438,771 B2 | 9/2016 | Yokoyama et al. | |
| 2007/0166025 A1 | 7/2007 | Chang | |
| 2009/0002574 A1* | 1/2009 | Sorek | H04N 5/217 348/784 |
| 2010/0013966 A1* | 1/2010 | Feng | H04N 5/3572 348/273 |
| 2012/0218433 A1* | 8/2012 | Okada | H04N 9/045 348/222.1 |
| 2013/0050541 A1* | 2/2013 | Hatakeyama | H04N 5/23229 348/241 |
| 2013/0242129 A1* | 9/2013 | Harmeling | G06T 5/001 348/222.1 |
| 2013/0308018 A1 | 11/2013 | Sasaki | |
| 2015/0097994 A1* | 4/2015 | Yokoyama | H04N 5/3572 348/242 |

FOREIGN PATENT DOCUMENTS

| | | |
|---|---|---|
| JP | 5505135 B2 | 5/2014 |
| JP | 2015033117 A | 2/2015 |
| JP | 2015222870 A | 12/2015 |

* cited by examiner

IMAGE PROCESSING APPARATUS, IMAGE CAPTURING APPARATUS, LENS APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to an image processing apparatus which corrects a lateral chromatic aberration (chromatic aberration of magnification).

Description of the Related Art

Image capturing apparatuses such as digital cameras are used for various purposes. However, various aberrations of an image capturing optical system that is used to form an object image are factors of degrading an image quality of the object image. Among the aberrations, a lateral chromatic aberration is a factor of occurrence of a color shift in the object image. It this respect, conventionally, for example a technology where the lateral chromatic aberration is corrected by image processing based on data of the lateral chromatic aberration of the image capturing optical system previously stored is known.

On the other hand, the number of pixels of an image sensor used in the image capturing apparatus increases year after year, and a size of a unit pixel tends to be reduced. Therefore, even in the lateral chromatic aberration whose amount was not conventionally a substantial problem, it may be a main factor of degrading the image quality. When design data of the image capturing optical system are stored as data of the lateral chromatic aberration, the image quality is degraded by an uncorrected change of the lateral chromatic aberration caused by a manufacturing error of the image capturing optical system. In this specification, the lateral chromatic aberration means a shift of an imaging position for each color (i.e., color shift), and it appears due to a movement of an image in each pixel, differently from a blur caused by an imaging performance. In order to reflect the manufacturing error of the individual image capturing optical system on the data of the lateral chromatic aberration, it is necessary to measure a real aberration amount that changes for each lens parameter at the time of the manufacture, which leads to a decrease in mass productivity and an increase in manufacturing cost. If the change of the lateral chromatic aberration caused by the manufacturing error is not separated as an appropriate component, a correction amount needs to be stored for each pixel. As a result, correction data amount increases or a correction effect is insufficient. technology where the lateral chromatic aberration corresponding to the manufacturing error is corrected based on a rotationally symmetric component with respect to the center of an image and a correction amount calculated as a shift component where an amount and a direction of a color shift is uniform in an entire image.

As the manufacturing error of the image capturing optical system, there are eccentricity from an optical axis or a tilt of a lens element or a lens unit, a position shift parallel to the optical axis direction, a focal length shift caused by a shape or a refractive index of the lens element, and the like. A lateral shift of an image mainly occurs for each color due to the eccentricity or the tilt of the lens element or the lens unit, and a magnification shift of the image occurs for each color due to the position shift parallel to the optical axis direction or the focal length shift of the lens element. However, since Japanese Patent No. 5505135 assumes that the eccentricity from the optical axis and the tilt of the lens element and the lens unit as the manufacturing error, the magnification shift for each color cannot be corrected, and the lateral chromatic aberration changed due to the manufacturing error cannot be corrected satisfactorily.

SUMMARY OF THE INVENTION

The present invention provides an image processing apparatus, an image capturing apparatus, a lens apparatus, an image processing method, and a non-transitory computer-readable storage medium which are capable of correcting a lateral chromatic aberration generated due to a manufacturing error of an image capturing optical system with high accuracy with a small data amount.

An image processing apparatus as one aspect of the present invention includes an acquirer configured to acquire information related to a lateral chromatic aberration and a corrector configured to correct an image to reduce the lateral chromatic aberration based on the information related to the lateral chromatic aberration, the information related to the lateral chromatic aberration includes a first component related to a design value, and a second component related to a manufacturing error, each of the first component and the second component is a rotationally symmetric component.

An image capturing apparatus as another aspect of the present invention includes an image sensor configured to photoelectrically convert an optical image formed via an image capturing optical system to output image data and the image processing apparatus configured to correct an image corresponding to the image data.

A lens apparatus as another aspect of the present invention is removably attached to an image capturing apparatus capable of correcting an image to reduce a lateral chromatic aberration based on information related to the lateral chromatic aberration, and includes an image capturing optical system and a memory configured to store the information related to the lateral chromatic aberration, the information related to the lateral chromatic aberration includes a first component related to a design value, and a second component related to a manufacturing error, each of the first component and the second component is a rotationally symmetric component.

An image processing method as another aspect of the present invention includes the steps of acquiring information related to a lateral chromatic aberration and correcting an image to reduce the lateral chromatic aberration based on the information related to the lateral chromatic aberration, the information related to the lateral chromatic aberration includes a first component related to a design value, and a second component related to a manufacturing error, each of the first component and the second component is a rotationally symmetric component.

A non-transitory computer-readable storage medium as another aspect of the present invention stores the program.

Further features of the present invention will become apparent from the following description of exemplary embodiments with reference to the attached drawings

DESCRIPTION OF THE EMBODIMENTS

Exemplary embodiments of the present invention will be described below with reference to the accompanied drawings.

First, a mechanism where a lateral chromatic aberration occurs due to a manufacturing error of an image capturing optical system (optical system) will be described. As manufacturing errors of the image capturing optical system, there is an eccentricity or a tilt of a lens element and a lens unit with respect to an optical axis, a position shift which is parallel to an optical axis direction, a displacement of a focal length caused by a shape or a refractive index of the lens element, or the like.

When the image capturing optical system is rotationally symmetric with respect to the optical axis, a chromatic aberration occurs in a rotationally symmetric manner. On the other hand, when the lens element or the lens unit is eccentric or tilted, a rotationally asymmetric lateral chromatic aberration that is unique to an eccentric optical system (off-axis optical system) occurs. In an image stabilizing optical system as an example where a part of lens units is eccentric in a direction perpendicular to the optical axis, according to the eccentricity or the tilt, an image plane formed by the image capturing optical system is shifted in the direction perpendicular to the optical axis with reference to an object plane. In this case, since a shift amount changes for each wavelength by dispersion of the eccentric lens unit, a shift occurs in a direction and an amount that is uniform in an entire screen (entire image) for each color. Furthermore, a lateral chromatic aberration which is non-uniform in the entire screen occurs according to a difference of eccentric distortion for each color.

On the other hand, when the shift of the focal length caused by the shape or refractive index of the lens element or the like occurs, a magnification of an image or a rotationally symmetric aberration component changes. In this case, a change amount (variation) changes for each wavelength depending on the dispersion of the lens unit that causes the shift, and accordingly a rotationally symmetric position shift occurs for each color.

Figure 1A:
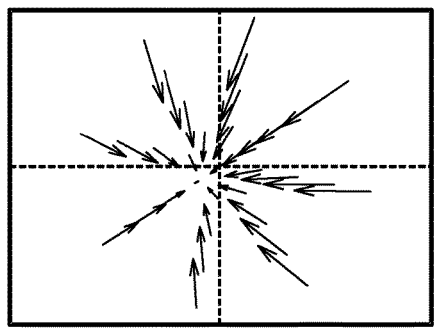
FIGS. 1A to 1E are schematic diagrams of lateral chromatic aberrations corresponding to manufacturing errors.

In a real optical system, respective color shifts occur by a plurality of lens elements, and as a result the lateral chromatic aberration with a complicated pattern occurs. FIGS. 1A to 1E illustrate examples of such patterns of the lateral chromatic aberration. FIG. 1A is a pattern of the lateral chromatic aberration when a manufacturing error is given to the image capturing optical system which is designed to be rotationally symmetric with respect to the optical axis, and it illustrates an example where an amount of the eccentric distortion is small. Each vector represents a direction and an amount of the lateral chromatic aberration at a start point position of the vector. When an RGB image is captured, different patterns appear between R and G and between B and G. As can be seen in FIG. 1A, in a rotationally symmetric optical system originally the center of the optical axis and the center of the screen coincide with each other, and a pattern of the lateral chromatic aberration occurs symmetrically with respect to the center of the optical axis or the screen. However, in this case, a pattern of the lateral chromatic aberration which is not symmetric in an entire area of the screen also occurs.

Figure 1B:
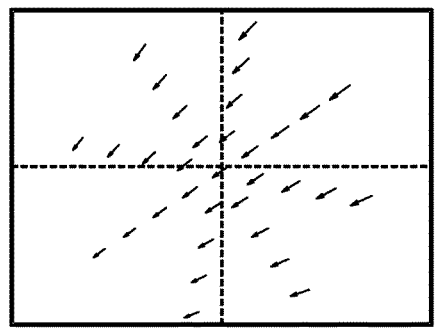
Figure 1C:
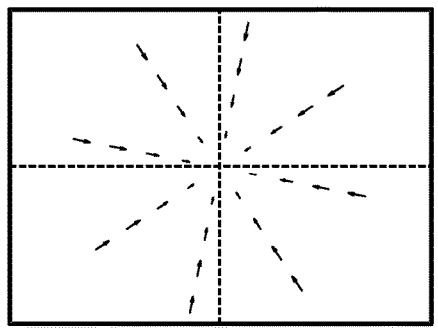
Figure 1D:
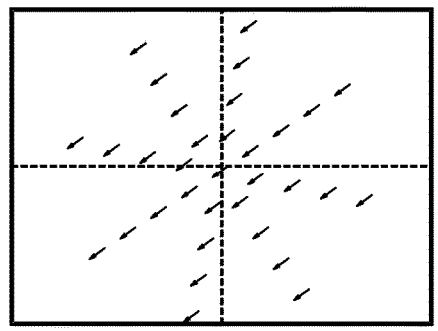
Figure 1E:
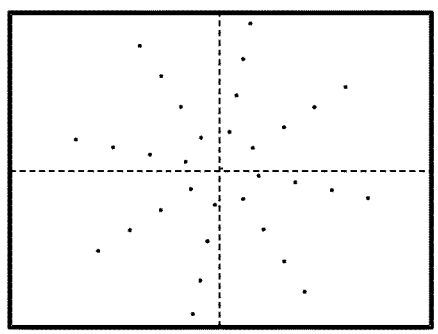

FIG. 1B illustrates a pattern of the lateral chromatic aberration after the pattern of the lateral chromatic aberration in FIG. 1A is corrected based on a component of the lateral chromatic aberration based on a design value (i.e., first component related to the design value). After the correction with the first component related to the design value, similarly to the uncorrected pattern, a pattern of the lateral chromatic aberration which is not symmetric in the entire area of the screen remains. This corresponds to a component of the lateral chromatic aberration resulting from the manufacturing error (i.e., component related to the manufacturing error). In a conventional correction of the lateral chromatic aberration where the manufacturing error is not considered, a correction remainder occurs as illustrated in FIG. 1B, and accordingly an image quality is deteriorated. The pattern of the lateral chromatic aberration corrected by the first component related to the design value can be approximated as a sum of a rotationally symmetric component as illustrated in FIG. 1C and a shift component as illustrated in FIG. 1D. The rotationally symmetric component illustrated in FIG. 1C is a shift component with a color shift vector that is uniform in the entire screen (i.e., third component where each of a color shift direction and a color shift amount is uniform in an image). In an optical system where the eccentric distortion cannot be ignored, an additional component of a color shift corresponding to the eccentric distortion occurs. When the eccentricity and the tilt are only considered as manufacturing errors, the component illustrated in FIG. 1D can be corrected, but the component illustrated in FIG. 1C and the component of the eccentric distortion remain even when the correction is performed.

As described above, the lateral chromatic aberration of the real image capturing optical system including the manufacturing errors can be approximated as a sum of the shift component which is uniform in the entire area of the screen (image) and the component which varies depending on a position in the image. The latter component is approximated as a sum of a component of a rotationally symmetric design value, a component resulting from the rotationally symmetric manufacturing error, and a component which corresponds to the eccentric distortion. Accordingly, even when the shift of an image for each color that is disclosed in Japanese Patent No. 5505135 is considered, it is difficult to correct the manufacturing error which varies depending on the area in the screen (image) with high accuracy. Since this embodiment performs the correction considering the components described above, as illustrated in FIG. 1E, the lateral chromatic aberration can be corrected with high accuracy.

In order to separate these components from each other, with respect to a component which is obtained by subtracting the component of the design value, the component separation may be performed based on its symmetry. When the component separation is performed by focusing only on the symmetry as disclosed in Japanese Patent No. 5505135, the component resulting from the manufacturing error that has the same symmetry as that of the component of the design value cannot be separated from the component of the design value. Accordingly, the component of the design value is previously determined, and as a result each of the rotationally symmetric component for the rotationally symmetric optical system, and the rotationally symmetric component and the component corresponding to the eccentric distortion for the rotationally asymmetric optical system can be separated as a component resulting from the manufacturing error.

In order to correct the lateral chromatic aberration affected by the manufacturing errors, it is necessary to measure how the lateral chromatic aberration occurs in a manufacturing process. On the other hand, in order to correct the lateral chromatic aberration which varies depending on an image capturing condition such as a zoom position, a focus position, and an aperture value, it is necessary to store the lateral chromatic aberrations discretely with respect to these control parameters to obtain the lateral chromatic aberration by interpolation for the parameters in a real image capturing.

The inventors have found that the shift component in FIG. 1D can be interpolated with high accuracy based on measurement data in a few image capturing conditions and that it is necessary to acquire measurement data in at least tens of image capturing conditions in order to interpolate the rotationally symmetric component other than the shift component with high accuracy. At the same time, the inventors have found that the interpolation can be performed with high accuracy based on the measurement data in a relatively few image capturing conditions only when the design value is subtracted to be separated into the component originating from the manufacturing error. This may be because the component based on the design value needs to be interpolated with a lot of image capturing conditions due to a large amount of change with respect to the image capturing condition, while a change amount of the variation component caused by the manufacturing error is smaller than that of the component based on the design value. In other words, with respect to a component represented by a model with the same symmetry as that of the component based on the design value from among the component based on the manufacturing error, it needs to be separated from the component based on the design value to perform the correction with high accuracy. While the eccentric distortion exists in the design value itself in the rotationally asymmetric optical system, similarly in this case, it is preferred that the interpolation is performed after the component based on the design value and the component originating from the manufacturing error are separated from each other.

Accordingly, in order to correct the lateral chromatic aberration with high accuracy according to each of various control parameters, it is preferred that the components based on the design value are stored correspondingly to the necessary and sufficient number of image capturing conditions (i.e., for each predetermined image capturing condition). More preferably, the components originating from the manufacturing error can be stored correspondingly to the fewer number of image capturing conditions (i.e., for each of the image capturing conditions whose number is fewer than the number of the predetermined image capturing conditions). Since the component based on the design value can be calculated with measurement of a representative model, simulation, or the like, it can be stored for each of the image capturing conditions whose number is larger (i.e., image capturing conditions whose number is the predetermined number). On the other hand, with respect to the component originating from the manufacturing error that requires the measurement in the manufacturing process, in order to ensure the equivalent accuracy to the component based on the design value, it may be stored for each of the image capturing conditions whose number is relatively small (i.e., image capturing conditions whose number is smaller than the predetermined number of the image capturing conditions). Since the component originating from the manufacturing error is to be stored separately from the component based on the design value, it is preferred that it is stored for each of the image capturing conditions whose number is small in view of reduction in data capacity.

An image processing apparatus (image processor 104) of this embodiment includes an acquirer 104b that acquires information related to a lateral chromatic aberration (information on the lateral chromatic aberration) and a corrector 104c that corrects an image to reduce the lateral chromatic aberration based on the information related to the lateral chromatic aberration. The information related to the lateral chromatic aberration includes a first component related to a design value and a second component related to a manufacturing error. Each of the first component and the second component varies depending on a position in the image (for example, varies depending on an image height in an optical system which is symmetric around the optical axis).

The first component is a component which is commonly used for a plurality of images (captured images) captured by using image capturing apparatuses (image capturing optical systems) different from each other. In other words, the first component is for example information related to the lateral chromatic aberration calculated by simulation based on the design value, and in the image capturing apparatuses (image capturing optical systems) manufactured based on the common design value, it is commonly used independently of their manufacturing errors (manufacturing variations).

On the other hand, the second component is a component which is different from each other with respect to each of the plurality of images captured by using the image capturing apparatuses (image capturing optical systems) different from each other, and it is information related to the lateral chromatic aberration originating from the manufacturing errors (manufacturing variations, or piece-to-piece variations) of the image capturing apparatuses (image capturing optical systems). As described above, the second component originating from the manufacturing error is different at each position (for example, each image height) in the image, and it may include a component which depends on the first component. Accordingly, first, the first component that is common to the plurality of images captured by different image capturing apparatuses (image capturing optical systems) is specified, and thus the second component can be determined. The information related to the lateral chromatic aberration that varies depending on the position in the image is separated into the first component and the second component each other, and as a result it is possible to correct the lateral chromatic aberration depending on the non-uniform manufacturing error that occurs with respect to the position in the image with high accuracy.

Preferably, each of the first component and the second component is a rotationally symmetric component. In many cases, image capturing optical systems are designed to be rotationally symmetric. Accordingly, by determining the first component as a rotationally symmetric component, the first component can be commonly used for the plurality of images (captured images) captured by using the image capturing apparatuses (image capturing optical systems) different from each other. In the rotationally symmetric image capturing optical systems, the rotationally symmetric component is mainly caused by a position shift in the optical axis direction of an optical element, and in particular, it easily occurs since it is a low order aberration component. Accordingly, by determining the second component as the rotationally symmetric component, it is possible to correct this component satisfactorily.

Preferably, rotationally symmetric centers of the first component and the second component are identical to each other. As a result, the symmetric centers can be commonized while the rotationally symmetric component originating from the manufacturing error is corrected. Accordingly, it is possible to perform common correction processing, and the data capacity required for the correction can be reduced since individual symmetric centers do not need to be stored. By commonizing the symmetric centers of the first component and the second component, it is possible to perform the correction of the lateral chromatic aberration with higher accuracy according to the manufacturing error.

Alternatively, the rotationally symmetric centers of the first component and the second component may be different from each other. In the image capturing optical system including the manufacturing error, a rotationally symmetric axis does not exist, and therefore the rotationally symmetric centers of the first component and the second component that occurs as a result of the position shift parallel to the optical axis direction of a lens element or the like do not need to be common. Accordingly, by designing the rotationally symmetric center of the second component to be different from the rotationally symmetric center of the first component depending on a real manufacturing error, the degree of freedom of the correction increases and thus the highly accurate correction where the approximation accuracy is further improved can be performed. Even when a high order aberration that is asymmetric with respect to the center of the screen occurs, the asymmetry can be reflected by changing the rotationally symmetric center, and accordingly it is possible to perform the correction with higher accuracy.

Preferably, the information related to the lateral chromatic aberration further includes a third component related to a manufacturing error. The third component is a component where each of a color shift direction and a color shift amount is uniform in the image (in an entire screen). In the rotationally symmetric image capturing optical system, the component where each of the color shift direction and the color shift amount is uniform in the entire screen occurs mainly due to the eccentricity or the tilt of the optical element. By using the third component, the components can be satisfactorily corrected.

Preferably, the image processing apparatus includes a memory 104d that stores information related to the lateral chromatic aberration, and the acquirer acquires, from the memory, at least a part of pieces of the information related to the lateral chromatic aberration. Preferably, the memory stores the information related to the lateral chromatic aberration for each image capturing condition (more preferably, each of a plurality of types of image capturing conditions). More preferably, the image capturing condition includes at least one of a zoom position, a focus position, and an aperture value. Thus, the lateral chromatic aberration that varies depending on the image capturing condition such as the zoom position, the focus position, and the aperture value can be corrected with high accuracy.

Preferably, the memory stores, as the information related to the lateral chromatic aberration, the first component and the second component separately from each other. Preferably, a data amount of the second component stored in the memory is smaller than a data amount of the first component stored in the memory. By separating the rotationally symmetric component into the first component and the second component, the second component can be represented as a component whose change in the image height direction is gentle, as well as the change related to the image capturing condition. Thus, when discrete values with respect to the image height (i.e. position in an image) are stored as the second component, they may be stored sparsely with respect to the image height compared to the first component.

Preferably, the memory stores, as a coefficient of an approximating polynomial, the change of the second component with respect to the image height (position in the image). When the coefficient of the approximating polynomial is stored, the approximation can be performed with a lower order polynomial. Discrete values may be densely stored with respect to the first component, while the low order polynomial may be stored with respect to the second component. Thus, the component originating from the manufacturing error can be corrected with high accuracy and also the data amount to be stored can be reduced. By separating the second component from the first component that is common to the image capturing apparatuses (image capturing optical systems) different from each other, it is possible to approximate the second component by using the low order polynomial. The second component can be approximated with high accuracy by using terms up to a third order.

Preferably, a data amount of the second component that varies depending on a predetermined image capturing condition of the image capturing conditions is smaller than a data amount of the first component that varies depending on the predetermined image capturing condition. In other words, with respect to a data amount (i.e. data amount related to a change with respect to the image height) that is stored for a common image capturing condition, the data amount of the second component is smaller than the data amount of the first component. Preferably, the image capturing condition includes a plurality of types of image capturing conditions, and the memory stores the first component for each of the plurality of types of image capturing conditions, and stores the second component for each part of the plurality of types of image capturing conditions. In other words, the number of types of image capturing conditions where the second component depend is smaller than the number of types of image capturing conditions where the first component depend. As described above, by separating the second component from the first component, the second component can be represented as a component that varies gently with respect to the control parameters (image capturing conditions) such as the zoom position, the focus position, and the aperture values. Accordingly, the number of the image capturing conditions that need to be measured in the manufacturing process as image capturing conditions where the second component depend can be reduced, and also the data amount to be stored can be reduced. In other words, the measurement is performed with predetermined values for at least one of the zoom position, the aperture value, and the focus position (i.e., the number of control parameters for measurement in a plurality of conditions is small). Alternatively, the number of conditions that is to be measured by at least one of the control parameters such as the zoom position, the aperture value, and the focus position is small. These measurement methods can also be combined.

Preferably, the memory stores, as the second component, only a component corresponding to a case where the zoom position is a predetermined zoom position. The corrector corrects the image by using the second component corresponding to the predetermined zoom position even when the zoom position is different from the predetermined zoom position. As described above, by separating the second component from the first component, the second component changes gently with respect to the control parameter (image capturing condition) such as the zoom position, the focus position, and the aperture stop. Accordingly, while the first component is stored with respect to the plurality of image capturing conditions, the second component is stored only for a representative value of the control parameters described above, and as a result it is possible to correct the lateral chromatic aberration with high accuracy for the plurality of image capturing conditions according to the manufacturing error. The number of the image capturing conditions where the manufacturing error is measured is determined by a product of the numbers that are to be stored for each control parameter. Accordingly, by performing the measurement of only one condition with respect to a control parameter, the number of the image capturing conditions for the measurement can be reduced. In addition, it is possible to reduce the data amount that is to be stored.

Preferably, the memory stores, as the second component, only a component corresponding to a case where the focus position is a predetermined focus position. The corrector corrects the image by using the second component corresponding to the predetermined focus position even when the focus position is different from the predetermined focus position. The inventors have found that the second component gently changes especially with respect to the focus position. Accordingly, by storing the second component as described above, the number of the measured image capturing conditions and the stored data amount can be greatly reduced. While it is possible to measure the manufacturing error by imaging an appropriate chart as an object by a known method, it is necessary to change a space between the image capturing apparatus and the chart, which results in reduction in mass productivity. Accordingly, by performing the measurement only for one condition with respect to the focus position, the acquisition of the change of the lateral chromatic aberration due to the manufacturing error can be easily achieved.

Preferably, the memory stores, as the second component, only a component corresponding to a case where the aperture value is a predetermined aperture value. The corrector corrects the image by using the second component corresponding to the predetermined aperture value even when the aperture value is different from the predetermined aperture value. The inventors have found that the second component gently changes especially with respect to the aperture value. Accordingly, by storing the second component as described above, the number of the measured image capturing conditions and the stored data amount can be greatly reduced.

Preferably, the corrector applies the second component uniformly to the change of the control parameter that is stored only with respect to one condition. When the second component gently changes with respect to the change of the control parameter, the second component is applied as a constant value, and accordingly it is possible to correct the lateral chromatic aberration with high accuracy depending on the manufacturing error for a plurality of image capturing conditions. For example, however, even when the second component gently changes over a wide focus range, it may change rapidly only in a part of the image capturing condition for focusing on a close-range object. In this case, as described below, the second component may be applied only within a range where the change is regarded to be gentle.

With respect to the control parameter measured only for one condition in the manufacturing process, in addition to the second component which corresponds to the condition where the measurement is performed, the second component which corresponds to the condition where the measurement is not performed may be stored. For example, when the measurement is performed for a first aperture value (for example, open state), the second component which corresponds to a second aperture value (for example, an aperture value which is larger by two steps than the open state) that is larger than the first aperture value may be stored. For example, by proportionally multiplying the second component measured with the first aperture value, the second component which corresponds to the second aperture value can be obtained. By determining a coefficient of proportionally multiplying the second component depending on the change of the second component according to the change of the control parameter, the measured second component can be applied only in a range where a reliability is high. When the coefficient of proportionally multiplying the second component is zero, the configuration where the second component is not applied can be obtained. In this example, while the measurement is performed only with respect to one condition, the second component is not applied uniformly. The same is applied to the zoom position or the focus position.

Furthermore, the same is applied to the control parameter where the measurement is performed in the manufacturing process with respect to a plurality of conditions. As an example of the zoom position, with respect to two zoom positions where corresponding components are measured and stored, an appropriate value corresponding to a middle zoom position may be stored. A value of proportionally multiplying the component at one of the two zoom positions, a value of proportionally multiplying a value interpolated based on the two zoom positions, a value or zero, or the like may be stored, and thus the measured second component can be weakened to be applied at a position other than the measured zoom positions.

Preferably, the acquirer acquires, from the memory, all pieces of information related to the lateral chromatic aberration required for correction of the image. Accordingly, the lateral chromatic aberration that corresponds to the manufacturing error can be corrected with high accuracy without a risk of a calculation load or a detection error for detecting the lateral chromatic aberration from the image.

Preferably, the image processing apparatus includes a detector 104e that detects, from the image, at least a part of pieces of information related to the lateral chromatic aberration, and the acquirer acquires, from the detector, at least the part of pieces of information related to the lateral chromatic aberration. More preferably, the acquirer acquires, from the detector, a part of pieces of information related to the lateral chromatic aberration, and it acquires, from the memory, a remaining piece of information related to the lateral chromatic aberration. In this configuration, with respect to the captured image of a common object, the component of lateral chromatic aberration that is not acquired from the memory is detected for each image. By acquiring a part of the lateral chromatic aberration from the memory, the calculation load or the detection error in detection from the image can be reduced. On the other hand, by detecting other components of the lateral chromatic aberrations for each image, a measurement load in the manufacturing process or a data amount that is to be stored can be reduced to correct the lateral chromatic aberration corresponding to the manufacturing error with high accuracy. For example, the first component based on the design value may be acquired from the memory, and the second component originating from the manufacturing error may be detected based on the image. By detecting, from the image, the component originating from the manufacturing error after correcting the lateral chromatic aberration based on the design value, the aberration that is to be detected can be reduced and the detection can be performed in a narrow image area, and accordingly the calculation load can be reduced. If it is difficult to ensure the number of measurements where a sufficient interpolation accuracy is achieved in a certain image capturing condition, such a method may be adopted. When an area where the lateral chromatic aberration can be detected only exists partially in the image, the detection accuracy is unstable with increasing the components. Accordingly, a part of the components is acquired from the memory and other components are acquired by detection from the image, and thus it is possible to perform the detection stably.

Preferably, the image processing apparatus includes a determiner 104a that determines whether the image is to be corrected by using the second component of the information related to the lateral chromatic aberration. The corrector corrects the image based on both of the first component and the second component when the determiner determines that the image is to be corrected by using the second component. On the other hand, the corrector corrects the image based on only the first component when the determiner determines that the image is not to be corrected by using the second component. As described above, for example, when focusing is performed on the close-range object, there is a case where the second component originating from the manufacturing error is not regarded as a component that gently changes. In this case, the measurement is performed in the manufacturing process only within a range where the change is regarded to be gentle. When it is determined that the second component originating from the manufacturing error can be corrected only within this range, the lateral chromatic aberration that corresponds to the manufacturing error can be corrected with respect to wide-range image capturing conditions while the measurement load is reduced. The measurement may be performed in the manufacturing process only within a range of image capturing conditions where the impact of the manufacturing error that gives to the lateral chromatic aberration is large. This range can be calculated by previously simulating the change of the lateral chromatic aberration when the manufacturing error occurs. In this case, the lateral chromatic aberration that corresponds to the manufacturing error can be corrected only for effective image capturing conditions while the measurement load is reduced. When the image capturing optical system is readjusted and the adjusted remaining error cannot be measured or the like, it is preferred that the determiner determines the correction based only on the first component.

A lens apparatus (interchangeable lens) of this embodiment is removably attached to an image capturing apparatus capable of correcting an image to reduce the lateral chromatic aberration based on the information related to the lateral chromatic aberration, and it include an image capturing optical system 101 and a memory that stores the information related to the lateral chromatic aberration. Similarly, to the memory 104d, the memory provided in the lens apparatus includes the first component related to the design value of the image capturing optical system and the second component related to the manufacturing error of the image capturing optical system. Preferably, the lens apparatus includes a communicator that sends the information related to the lateral chromatic aberration in response to a request for the information related to the lateral chromatic aberration from the image capturing apparatus. The memory of the lens apparatus stores the information related to the lateral chromatic aberration, and thus it is possible to correct the lateral chromatic aberration corresponding to the manufacturing error even in the interchangeable lens that is removably attached to the image capturing apparatus. If the information related to the lateral chromatic aberration is stored in a memory of an apparatus other than the lens apparatus, it is necessary to store the information corresponding to manufactured lens apparatuses individually. On the other hand, by storing the information related to the lateral chromatic aberration in the memory of the lens apparatus, via the communicator, the information on the lateral chromatic aberration only for the lens apparatus can be sent to the image processing apparatus. Thus, the lateral chromatic aberration corresponding to the manufacturing error can be corrected while a data amount stored in the image processing apparatus is suppressed. As described above, the lens apparatus of this embodiment is removably attached to the image capturing apparatus that corrects the lateral chromatic aberration. Accordingly, it is possible to correct the lateral chromatic aberration in the image capturing apparatus, and thus an image where the lateral chromatic aberration corresponding to the manufacturing error has been corrected can be obtained even when the image is transferred to a personal computer or the like.

This embodiment can be applied also to a case where the lens apparatus is integrated with the image capturing apparatus including the image sensor.

Hereinafter, the image processing apparatus (image capturing apparatus) of the present invention will be specifically described in each embodiment.

Embodiment 1

Figure 2:
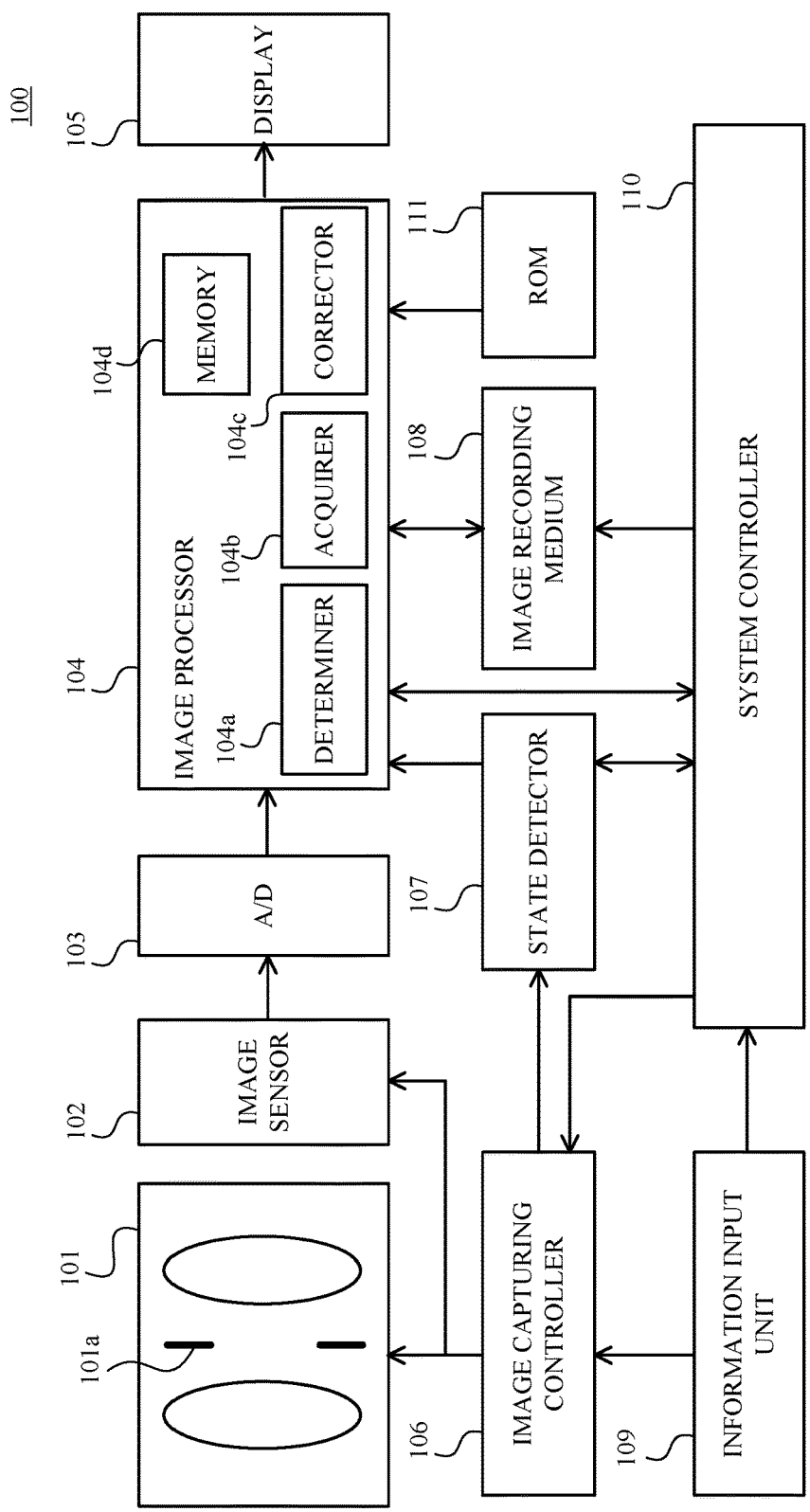
FIG. 2 is a block diagram of an image processing apparatus in Embodiment 1.

First, referring to FIG. 2, an image capturing apparatus in Embodiment 1 of the present invention will be described. FIG. 2 is a block diagram of an image capturing apparatus 100 in this embodiment.

The image capturing apparatus 100 includes an image capturing unit including an image capturing optical system 101 and an image sensor 102. The image capturing optical system 101 including an aperture stop 101a forms an image of light emitted from an object (not illustrated) on the image sensor 102. The image sensor 102 includes a photoelectric conversion element such as a CCD sensor and a CMOS sensor, and it photoelectrically converts an object image (optical image) formed via the image capturing optical system 101 to output image data (analog signal). The analog signal generated by photoelectric conversion of the image sensor 102 is converted by an A/D converter 103 into a digital signal to be output to an image processor 104.

The image processor 104 (image processing apparatus) performs correction processing of a lateral chromatic aberration due to a manufacturing error, as well as image processing that is commonly performed on the digital signal. The image processor 104 includes a determiner 104a that determines a method of correcting the lateral chromatic aberration described below. Furthermore, the image processor 104 includes an acquirer 104b that acquires information on the lateral chromatic aberration from a ROM 111 (memory), a corrector 104c that performs the correction processing of the lateral chromatic aberration, and a memory 104d that stores information related to the lateral chromatic aberration including a first component and a second component. In this embodiment, at least one processor or circuit may be configured to perform a function of each unit in the image processor 104.

An output image processed by the image processor 104 is stored in an image recording medium 108 such as a semiconductor memory and an optical disk. In this case, the information on the lateral chromatic aberration acquired by the acquirer 104b may be written in an output image file. The output image may be displayed on a display 105.

An information input unit 109 detects information on an image capturing condition such as an aperture value and an exposure time that is selected and input by a user, and it supplies data (i.e., data corresponding to the input information) to a system controller 110. An image capturing controller 106 controls the aperture value and the exposure time of the image capturing optical system 101, the image sensor 102, and the like while moving a focus lens (not illustrated) based on information from the system controller 110 to acquire a necessary or satisfactory image. A state detector 107 acquires current image capturing condition information (i.e., image capturing condition when acquiring a captured image) according to a control instruction (control signal) of the system controller 110. The image capturing condition information includes information such as an aperture value, a zoom position, and a focus position of the image capturing optical system 101, an exposure time, and an ISO sensitivity of the image sensor 102. The image capturing condition information only needs to include at least one of pieces of information described above, and it may include additional information. The image capturing optical system 101 may be integrated with the image sensor 102, or alternatively it may be an interchangeable image capturing optical system (i.e., lens interchangeable type camera) such as a single lens reflex camera. When it is the interchangeable image capturing optical system, the system can be separated into an image capturing apparatus and a lens apparatus.

In this case, it is preferred that the ROM 111 is provided in the lens apparatus and that the acquirer of the image capturing apparatus acquires the information on the lateral chromatic aberration via communication between the lens apparatus and the image capturing apparatus. At least a part of functions of the ROM 111 may be provided in the image capturing apparatus.

Figure 3:
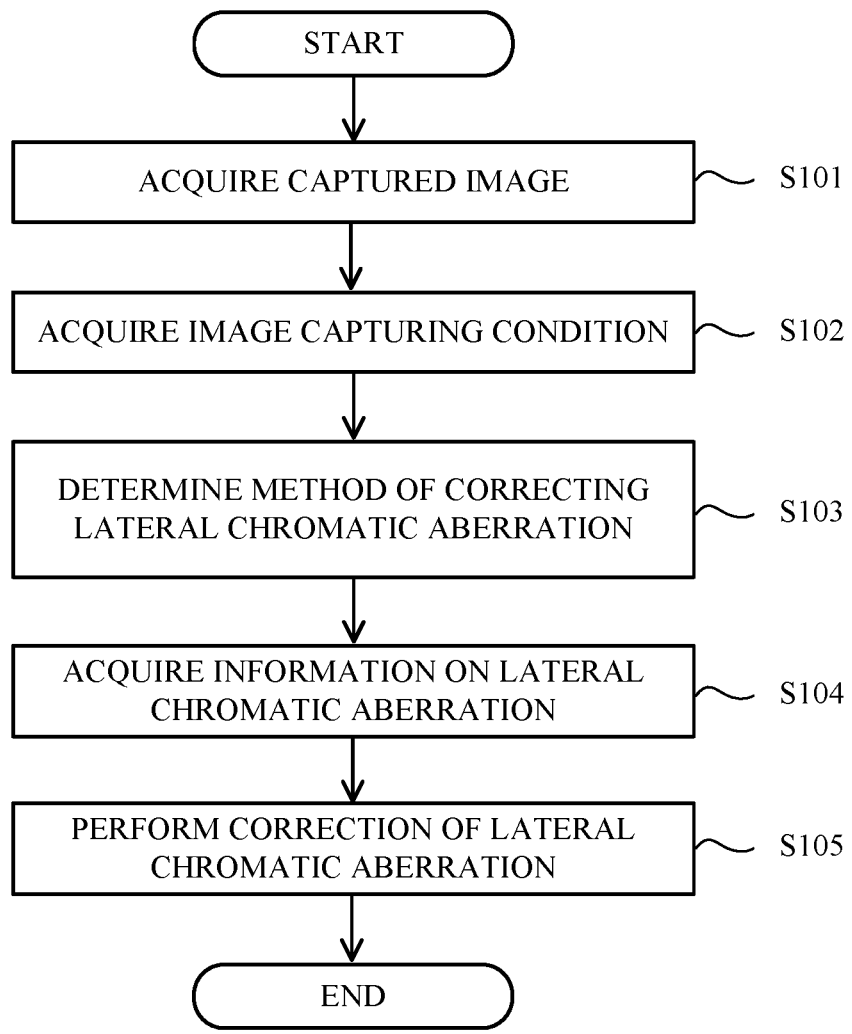
FIG. 3 is a flowchart of an image processing method in Embodiment 1.

Next, referring to FIG. 3, an image processing method in this embodiment will be described. FIG. 3 is a flowchart of the image processing method (i.e., procedure of performing the correction processing of the lateral chromatic aberration) in this embodiment. Each step illustrated in FIG. 3 is performed mainly by each unit of the image processor 104 based on an instruction of the system controller 110. This correction processing of the lateral chromatic aberration is executed by a computer constituted by a CPU or the like included in the image processing apparatus according to an image processing program as a computer program. This processing does not have to be performed on software, and it may be performed on a circuit. In other words, at least one of a processor or a circuit may be configured to perform each function of (each unit of) the image processor 104.

First, at step S101, the system controller 110 controls the image capturing unit including the image capturing optical system 101 and the image sensor 102 to form an image (i.e., acquire a captured image) of an object. Subsequently, at step S102, the state detector 107 acquires current image capturing condition information (i.e., image capturing condition specified when the captured image is acquired) according to a control instruction of the system controller 110.

Subsequently, at step S103, the determiner 104a determines a method of correcting the lateral chromatic aberration. Specifically, it determines whether the correction of the lateral chromatic aberration corresponding to a manufacturing error needs to be performed on a control parameter (image capturing condition) such as a focus position. As described above, when it cannot be assumed that a component of lateral chromatic aberration resulting from the manufacturing error gently changes with respect to the control parameter or it is considered that the influence of the manufacturing error is small according to a previously performed simulation, the measurement in a manufacturing process do not have to be performed. The determiner 104a performs the determination described above depending on whether the current image capturing condition corresponds to the case where the measurement data do not exist. When the component of lateral chromatic aberration resulting from the manufacturing error includes a rotationally symmetric component and a shift component or the like, the determiner 104a may perform the determination on each component. When the image capturing optical system 101 is an interchangeable type image capturing optical system, it is preferred that the determiner 104a perform the determination considering whether a lens apparatus including the image capturing optical system 101 include information on the lateral chromatic aberration corresponding to the manufacturing error. When the image capturing optical system 101 is readjusted, it is preferred that the determiner 104a perform the determination considering whether the information on the lateral chromatic aberration includes the information on the adjusted lateral chromatic aberration.

Subsequently, at step S104, the acquirer 104b acquires the information on the lateral chromatic aberration from the ROM 111 (memory). In this case, the acquirer 104b acquires data related to a necessary component of lateral chromatic aberration based on the determination performed at step S103 from among the data stored in the ROM 111. In this embodiment, the ROM 111 stores a first component of lateral chromatic aberration (first component) as a rotationally symmetric component based on a design value, a second component of lateral chromatic aberration (second component) as a rotationally symmetric component resulting from a manufacturing error, and a third component of lateral chromatic aberration (third component) as a shift component resulting from a manufacturing error. Data of each of components of the lateral chromatic magnifications are stored as a data table.

The first component includes an amount of a lateral chromatic aberration in a radial direction discretely with respect to for example each of control parameters of an aperture value, a zoom position, and a focus position, and an image height. The acquirer 104b acquires the amount of the lateral chromatic aberration for each image height with respect to the current control parameters by using an interpolation method such as a linear interpolation from among the amounts of the lateral chromatic aberration for the control parameters stored in the ROM 111. Then, the acquirer 104b performs the interpolation with respect to the image height to acquire a two-dimensional color shift amount for each pixel. With respect to the first component of lateral chromatic aberration (first component), a change of the image height of the amount of the lateral chromatic aberration may increase according to an aberration property or the image capturing condition of the image capturing optical system 101. Therefore, with respect to the image height, it is preferred that data including ten or several tens of points are included.

Each of the second component and the third component includes, with respect to each of the aperture value and the focus position, only values corresponding to the respective representative values. On the other hand, with respect to the zoom position, it may be rough compared to the first component of lateral chromatic aberration, but a plurality of values are discretely stored. With respect to the zoom position where the plurality of values, the interpolation is performed similarly to the first component of lateral chromatic aberration, and with respect to each of the aperture value and the focus position, the stored value may be uniformly used. The second component of lateral chromatic aberration is stored for example as coefficients of a cubic function with respect to the image height in an image height direction. When a symmetric center position of the second component of lateral chromatic aberration is different from that of the first component of lateral chromatic aberration, the symmetric center position needs to be stored for each color. The acquirer 104b acquires a two-dimensional color shift amount for each pixel based on these values. The third component of lateral chromatic aberration is uniform in an entire screen (image), and accordingly it is stored as a vector that represents a direction and an amount of the shift for each color. This vector is the two-dimensional color shift amount for each pixel. Finally, the acquirer 104b calculates a sum of each of the components to acquire a color shift amount for each pixel required for correction.

Subsequently, at step S105, the corrector 104c performs the correction of the lateral chromatic aberration on the captured image acquired at step S101 based on the information on the lateral chromatic aberration acquired at step S104. As described above, the correction of the lateral chromatic aberration corresponding to the manufacturing errors can be performed with high accuracy.

Embodiment 2

Figure 4:
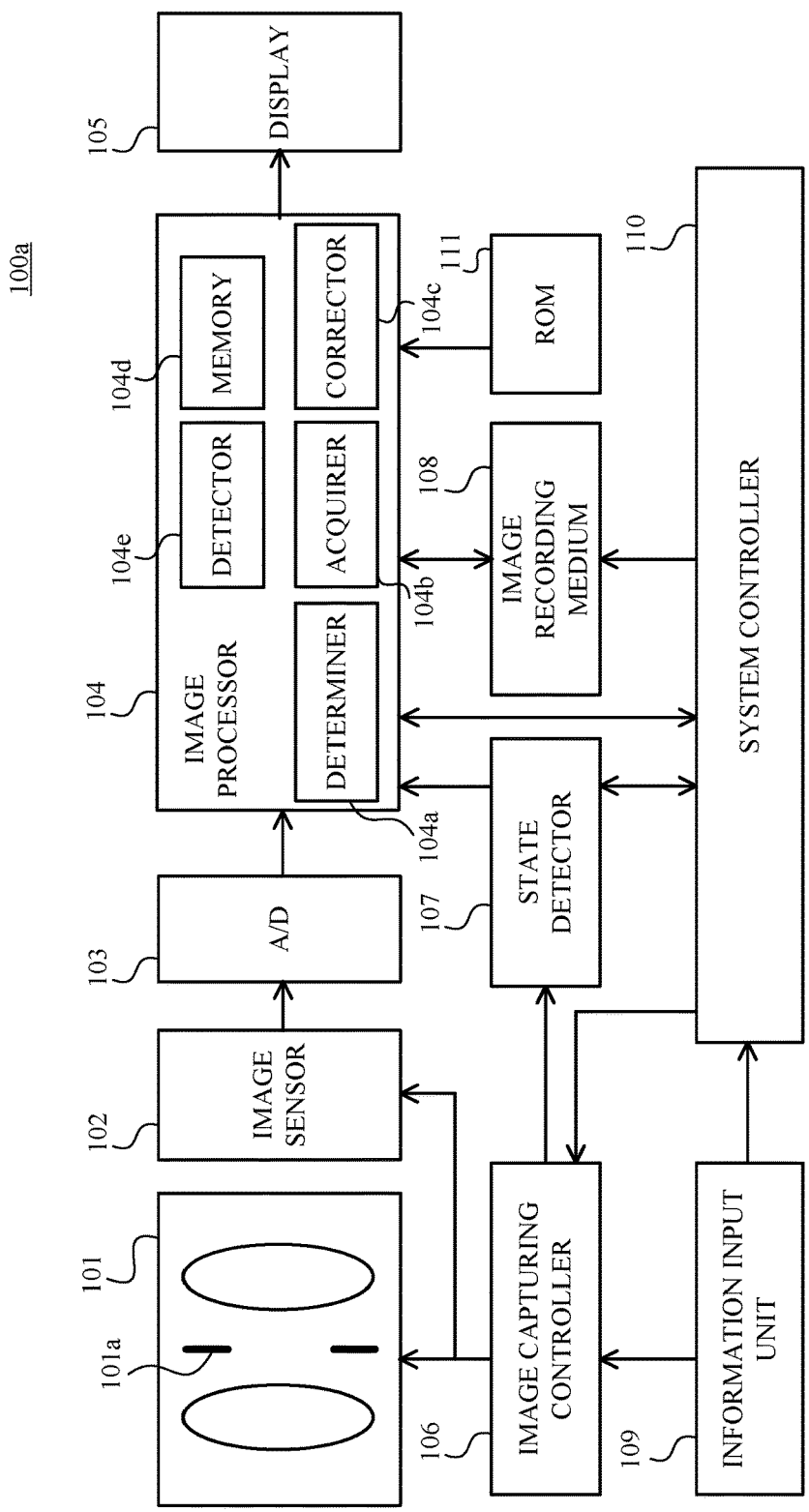
FIG. 4 is a block diagram of an image processing apparatus in Embodiment 2.

Next, referring to FIG. 4, an image capturing apparatus in Embodiment 2 of the present invention will be described. FIG. 4 is a block diagram of an image capturing apparatus 100a in this embodiment.

The image capturing apparatus 100a of this embodiment includes a detector 104e, which is different from the image capturing apparatus 100 of Embodiment 1 that does not include the detector 104e. Other configurations of the image capturing apparatus 100a are the same as those of the image capturing apparatus 100 of Embodiment 1, and accordingly descriptions thereof will be omitted. In an image processing method of this embodiment, steps S101, S102, and S105 of Embodiment 1 described referring to FIG. 3 are similarly applied and accordingly descriptions thereof will be omitted.

At step S103, similarly to Embodiment 1, the determiner 104a determines the method of correcting the lateral chromatic aberration. In this case, the determiner 104a determines whether the acquirer 104b acquires the component of lateral chromatic aberration from the memory 104d or the detector 104e, as well as determines whether each of the lateral chromatic aberrations is to be corrected.

Subsequently, at step S104, the acquirer 104b acquires the component of lateral chromatic aberration similarly to Embodiment 1 with respect to the component of lateral chromatic aberration to be acquired from the memory 104d. On the other hand, with respect to the component of lateral chromatic aberration to be acquired from the detector 104e, the acquirer 104b acquires the component of lateral chromatic aberration from a captured image as a correction target according to a known method. Then, the acquirer 104b calculates a sum of the components of the lateral chromatic aberrations acquired by each method to acquire a color shift amount for each pixel required for the correction.

Embodiment 3

Next, Embodiment 3 of the present invention will be described. While Embodiment 1 describes the image capturing apparatus 100 including the image processor 104 (image processing apparatus), this embodiment will describe an example where the correction of the lateral chromatic aberration is performed by an image processing program installed in a personal computer that corresponds to the image processing apparatus. The personal computer acquires a captured image generated by an image capturing apparatus via wired/wireless communication from the image capturing apparatus, or via a line such as the internet from other personal computers. It may acquire the captured image via an image recording medium in which the captured image is recorded. The information on the lateral chromatic aberration is acquired by reading data written in an image file. Then, the personal computer that acquires the captured image and the information on the lateral chromatic aberration performs the correction processing of the lateral chromatic aberration to output an image obtained as a result of the processing.

According to each embodiment, an image processing apparatus, an image capturing apparatus, a lens apparatus, an image processing method, and a non-transitory computer-readable storage medium which are capable of correcting a lateral chromatic aberration generated due to a manufacturing error of an image capturing optical system with high accuracy with a small data amount can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-082600, filed on Apr. 18, 2016, which is hereby incorporated by reference herein in its entirety.

What is claimed is:

1. An image processing apparatus comprising:
   an acquirer configured to acquire information related to a lateral chromatic aberration; and
   a corrector configured to correct an image to reduce the lateral chromatic aberration based on the information related to the lateral chromatic aberration, wherein the information related to the lateral chromatic aberration includes a first component related to a design value, a second component related to a manufacturing error, wherein each of the first component and the second component is a rotationally symmetric component.

2. The image processing apparatus according to claim 1, wherein rotationally symmetric centers of the first component and the second component are identical to each other.

3. The image processing apparatus according to claim 1, wherein rotationally symmetric centers of the first component and the second component are different from each other.

4. The image processing apparatus according to claim 1, wherein the information related to the lateral chromatic aberration includes information of a third component related to a manufacturing error, and wherein the third component is a component where each of a color shift direction and a color shift amount is uniform in the image.

5. The image processing apparatus according to claim 1, further comprising a memory configured to store information related to the lateral chromatic aberration, wherein the acquirer acquires, from the memory, at least a part of pieces of the information related to the lateral chromatic aberration.

6. The image processing apparatus according to claim 5, wherein the memory stores, as the information related to the lateral chromatic aberration, the first component and the second component separately from each other.

7. The image processing apparatus according to claim 5, wherein a data amount of the second component stored in the memory is smaller than a data amount of the first component stored in the memory.

8. The image processing apparatus according to claim 5, wherein the memory stores, as a coefficient of an approximating polynomial, a change of the second component with respect to an image height.

9. The image processing apparatus according to claim 5, wherein the memory stores the information related to the lateral chromatic aberration for each image capturing condition.

10. The image processing apparatus according to claim 9, wherein a data amount of the second component that varies depending on a predetermined image capturing condition of the image capturing conditions is smaller than a data amount of the first component that varies depending on the predetermined image capturing condition.

11. The image processing apparatus according to claim 9, wherein the image capturing condition includes a plurality of types of image capturing conditions, and wherein the memory stores the first component for each of the plurality of types of image capturing conditions, and stores the second component for each part of the plurality of types of image capturing conditions.

12. The image processing apparatus according to claim 9, wherein the image capturing condition includes at least one of a zoom position, a focus position, and an aperture value.

13. The image processing apparatus according to claim 12, wherein the memory stores, as the second component, only a component corresponding to a case where the zoom position is a predetermined zoom position, and wherein the corrector corrects the image by using the second component corresponding to the predetermined zoom position even when the zoom position is different from the predetermined zoom position.

14. The image processing apparatus according to claim 12, wherein the memory stores, as the second component, only a component corresponding to a case where the focus position is a predetermined focus position, and wherein the corrector corrects the image by using the second component corresponding to the predetermined focus position even when the focus position is different from the predetermined focus position.

15. The image processing apparatus according to claim 12, wherein the memory stores, as the second component, only a component corresponding to a case where the aperture value is a predetermined aperture value, and wherein the corrector corrects the image by using the second component corresponding to the predetermined aperture value even when the aperture value is different from the predetermined aperture value.

16. The image processing apparatus according to claim 5, wherein the acquirer acquires, from the memory, all pieces of information related to the lateral chromatic aberration required for correction of the image.

17. The image processing apparatus according to claim 1, further comprising a detector configured to detect, from the image, at least a part of pieces of information related to the lateral chromatic aberration, wherein the acquirer acquires, from the detector, at least the part of pieces of information related to the lateral chromatic aberration.

18. The image processing apparatus according to claim 5, further comprising a detector configured to detect, from the image, a part of pieces of information related to the lateral chromatic aberration, wherein the acquirer acquires, from the detector, a part of pieces of information related to the lateral chromatic aberration, and wherein the acquirer acquires, from the memory, a remaining piece of information related to the lateral chromatic aberration.

19. The image processing apparatus according to claim 1, further comprising a determiner configured to determine whether the image is to be corrected by using the second component, wherein the corrector corrects the image based on both of the first component and the second component when the determiner determines that the image is to be corrected by using the second component, and wherein the corrector corrects the image based on only the first component when the determiner determines that the image is not to be corrected by using the second component.

20. An image capturing apparatus comprising:

an image sensor configured to photoelectrically convert an optical image formed via an image capturing optical system to output image data;

an acquirer configured to acquire information related to a lateral chromatic aberration; and a corrector configured to correct an image corresponding to the image data to reduce the lateral chromatic aberration based on the information related to the lateral chromatic aberration, wherein the information related to the lateral chromatic aberration includes a first component related to a design value, a second component related to a manufacturing error, wherein each of the first component and the second component is a rotationally symmetric component.

21. A lens apparatus removably attached to an image capturing apparatus capable of correcting an image to reduce a lateral chromatic aberration based on information related to the lateral chromatic aberration, the lens apparatus comprising:

an image capturing optical system; and a memory configured to store the information related to the lateral chromatic aberration, wherein the information related to the lateral chromatic aberration includes a first component related to a design value, a second component related to a manufacturing error, wherein each of the first component and the second component is a rotationally symmetric component.

22. The lens apparatus according to claim 21, further comprising a communicator configured to send the information related to the lateral chromatic aberration in response to a request for the information related to the lateral chromatic aberration from the image capturing apparatus.

23. An image processing method comprising the steps of:

acquiring information related to a lateral chromatic aberration; and correcting an image to reduce the lateral chromatic aberration based on the information related to the lateral chromatic aberration, wherein the information related to the lateral chromatic aberration includes a first component related to a design value, a second component related to a manufacturing error, wherein each of the first component and the second component is a rotationally symmetric component.

24. A non-transitory computer-readable storage medium which stores a program causing a computer to execute a process comprising the steps of:

acquiring information related to a lateral chromatic aberration; and correcting an image to reduce the lateral chromatic aberration based on the information related to the lateral chromatic aberration, wherein the information related to the lateral chromatic aberration includes a first component related to a design value, a second component related to a manufacturing error, wherein each of the first component and the second component is a rotationally symmetric component.

* * * * *